UNITED STATES PATENT OFFICE.

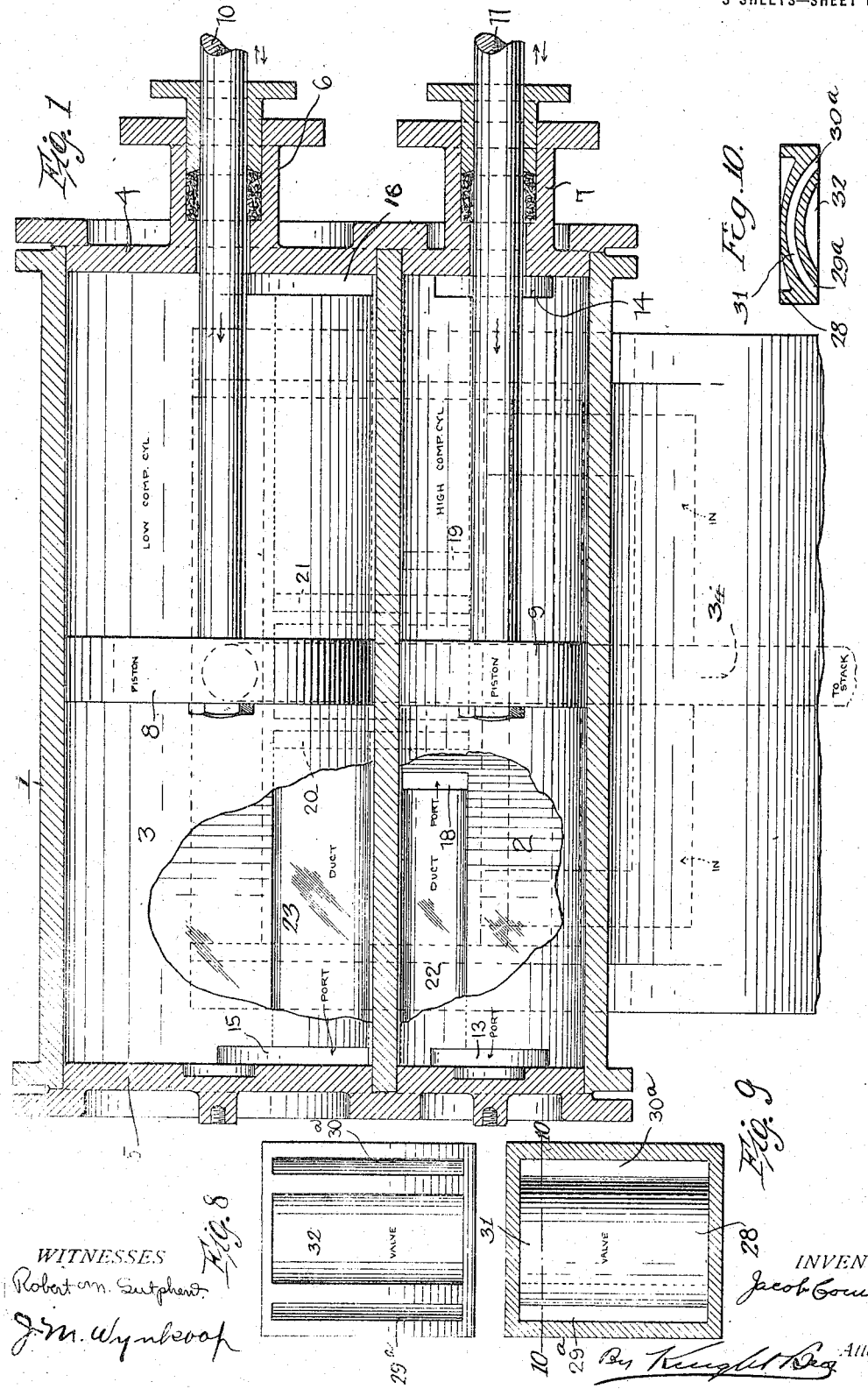

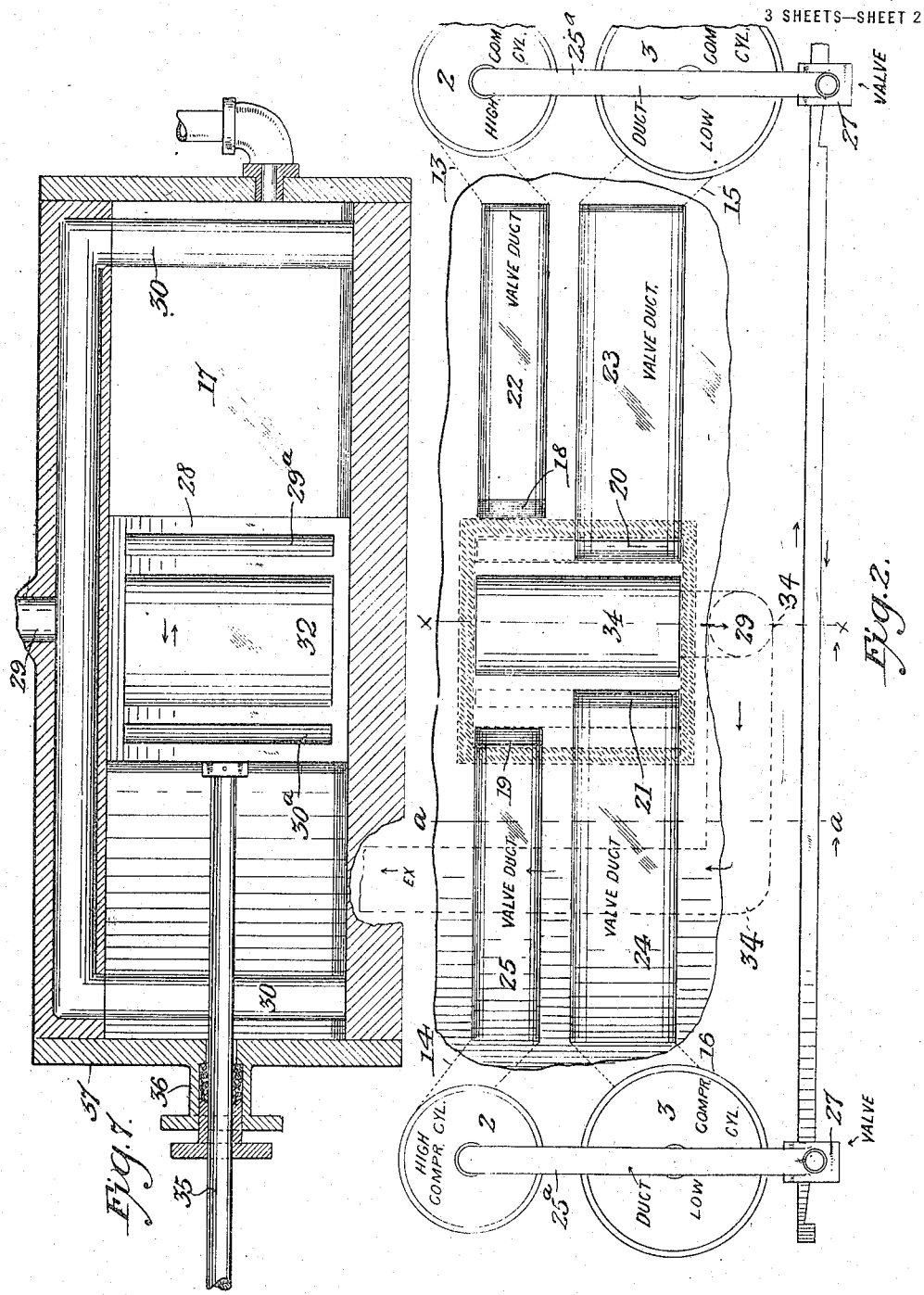

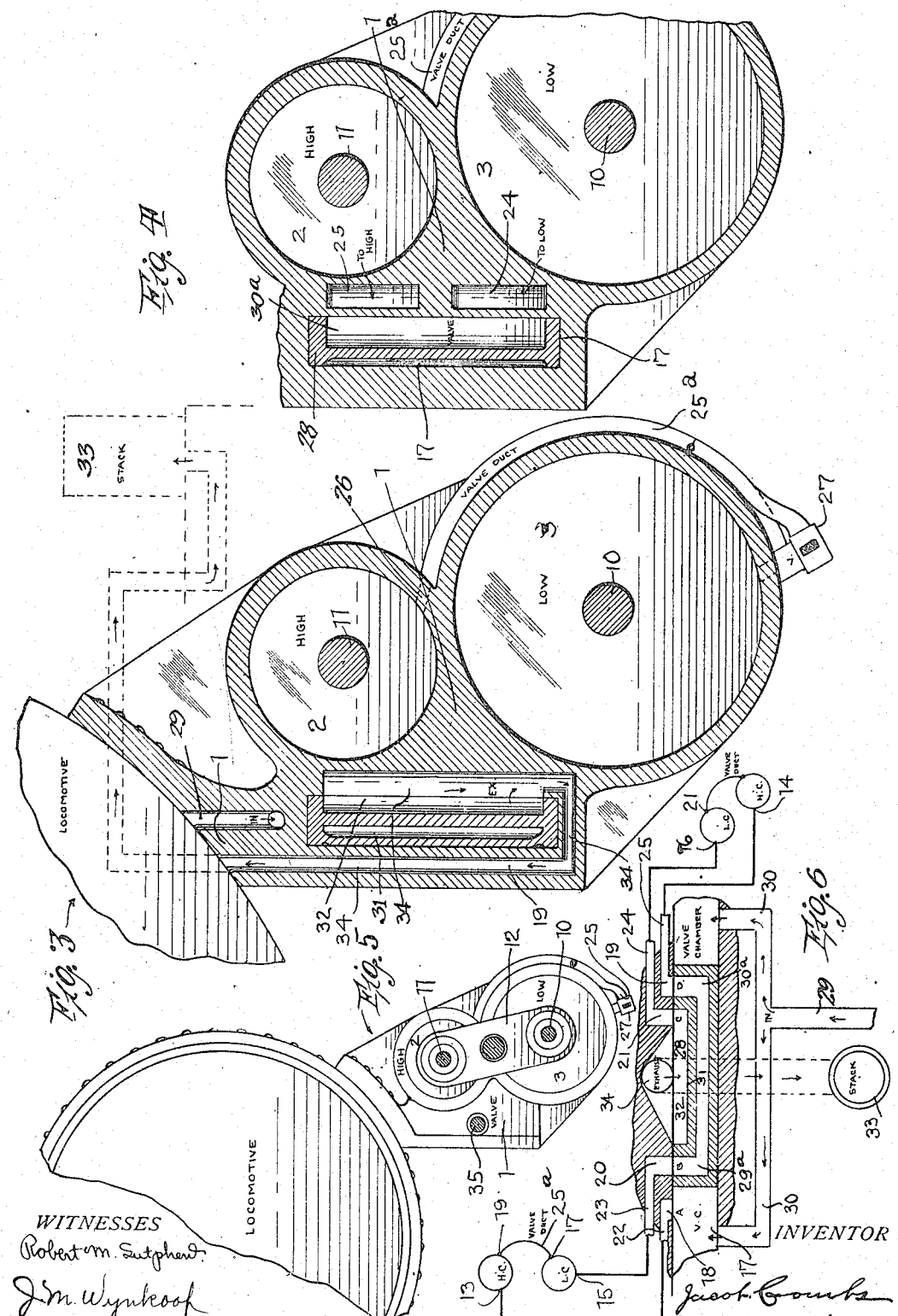

JACOB COMBS, OF FAYETTE COUNTY, NEAR MONTGOMERY, WEST VIRGINIA.

COMBINED COMPOUND ENGINE.

1,141,173. Specification of Letters Patent. Patented June 1, 1915.

Application filed October 30, 1912. Serial No. 728,720.

*To all whom it may concern:*

Be it known that I, JACOB COMBS, a citizen of the United States of America, residing in Fayette county, near Montgomery, West Virginia, have invented certain new and useful Improvements in Combined Compound Engines, of which the following is a specification.

In the drawing, Figure 1 is a longitudinal section of high and low pressure cylinders of a locomotive with associated parts illustrating my invention; Fig. 2 is a diagrammatic view of the same; Fig. 3 is a section on the line x—x Fig. 2; Fig. 4 is a section on the line a—a Fig. 2; Fig. 5 is an end elevation; Fig. 6 is a diagrammatic view showing the circulation of steam; Fig. 7 is a longitudinal section of the valve chamber; Fig. 8 is a top plan view of the slide valve; Fig. 9 is a longitudinal sectional view of the slide valve, and Fig. 10, a cross section along line 10—10 of Fig. 9.

The reference numeral 1 designates a casting in which is formed the high pressure cylinder 2 and the low pressure cylinder 3 having suitable heads 4 and 5, and stuffing boxes 6 and 7. Pistons 8 and 9 are positioned in said cylinders and provided with piston rods 10 and 11, connected to a cross head 12 shown diagrammatically in Fig. 5.

Ports 13 and 14 are formed in the wall of the high pressure cylinder at each end, and ports 15 and 16 are formed in the wall of the low pressure cylinder at each end.

17 is a valve chamber positioned back of the two cylinders and formed in the casting 1.

Leading from the valve chamber are four ports 18, 19, 20 and 21. The port 18 is connected by means of a duct 22, to the port 13 at one end of the high pressure cylinder, and the port 19 is connected to the port 14 of the same cylinder by a duct 23, while the duct 24 connects the ports 20 and 15, and the duct 24 connects the ports 16 and 21.

The two cylinders are in constant communication at each end by means of the duct 25$^a$ constituting a high pressure relief pipe which is connected to the cylinder cock, not shown; 27 is a valve with which the duct 28$^a$ is connected.

The valve chamber 17 is provided with a slide-way for the valve 28.

29 is the steam inlet port for the valve chamber from which ports or ducts 30 extend into the chamber.

The ports 18, 19, 20 and 21 open into the valve chamber whereby communication is established between the said valve chamber and the high and low pressure cylinders. The valve 28 is provided with elongated ports 29$^a$ and 30$^a$ between which, on the top of the valve, is a duct 31 constructed to overlap the exhaust duct 32 which leads into the stack 33, there being formed in the casting an exhaust duct 34 between the stack 33 and the duct 32 as more clearly seen in Figs. 3 and 6.

The valve 28 is provided with a valve rod 35 passing through a stuffing box 36 carried by the head 37 of the valve casing. It will be noted from Fig. 5 that the valve rod 35 is positioned to one side of the piston rods 10 and 11 so that there is no interference between the valve rod and the cross head 12 connecting the piston rods.

Steam will enter the port 29 and travel into the valve casing or steam chest 17, through the duct 30. The valve 28 will be moved ahead, that is toward the right in Figs. 2 and 7 and an outside lap of the valve will open the steam port 19, through which the steam will travel proceeding through the duct 25 and enter the back end of the high pressure cylinder through the port 14. The valve will then move in the opposite direction or to the left of Figs. 2 and 7 and open the steam port 18 from whence steam will travel through the duct 22, port 13, in the front end of the high pressure cylinder. The ports are now in position for the steam to exhaust out of the back end of the high pressure cylinder through the port 14, duct 25 and port 19 under the lap of valve, through the valve by means of duct and ports 30$^a$, 31 and 29$^a$, through steam port 20 duct 23 and steam port 15, and thence into the front end of the low pressure cylinder whereupon the valve 28 will again move forwardly and steam will exhaust out of the front end of the high pressure cylinder through port 13, duct 22, port 18, under the lap of the valve, through the valve ports and duct 29$^a$, 31 and 30$^a$ into the back of the low pressure steam cylinder, through the port 21, duct 24 and port 16, simultaneously the steam will exhaust out of the front end of the low pressure cylinder through the port 15, duct 23, port 20 under the inside lap of the valve and through the cavity port or exhaust duct 32 to the exhaust duct 34 and thence to the stack 33. The valve will again move back and the steam will exhaust out of the back end of the low pressure cylinder through the port 16, duct 24, port 21, under the inside lap of the valve 28 thence into cavity port or exhaust duct 32, thence into exhaust duct 34 and lastly to stack 33.

The following is the operation of the valve. First:—Valve in forward position. Fresh steam being always supplied in the valve chamber 17 through ducts 30 from the inlet port 29, steam will now enter into the rear end of the high pressure cylinder at 14 by way of port 19 and passage 25, and used steam will leave the front end of the high pressure cylinder at 13 entering the rear end of low pressure cylinder at 16 by way of ducts and ports 22, 18, 29ª, 31, 30ª, 21 and 24. Simultaneously steam will be exhausted from the front end of the low pressure cylinder at 15 by way of duct 23, port 20 and cavity 32 of the valve into exhaust duct 34 and stack 33. Second:—Valve in rearward position. Fresh steam now enters from valve chamber 17 through port 18, duct 22 and port 13 into front end of high pressure cylinder and used steam leaves rear end of high pressure cylinder at 14, entering from the end of low pressure cylinder at 15 by way of ducts and ports 25, 19, 30ª, 31, 29ª, 20 and 23, while steam is exhausted from the rear end of the low pressure cylinder 16 into the stack 33 by way of duct 24, port 21, valve cavity 32 and exhaust duct 34. It will be evident that the valve body having steam pressure both in front and in the rear is balanced in its longitudinal direction, and it will also be evident that the valve body is balanced transversely as live steam always passes through it, thus distributing its pressure equally in all directions. The valve is therefore properly balanced. It might also be noted that not only the valve duct 31 is used for passing steam in both directions, but that this is also the case with steam passages and ports 13, 14, 15, 16, 18, 19, 20, 21, 22, 23, 24, 25.

The high pressure relief pipes 25ª are connected at their ends to the high and low pressure cylinders, and can be opened and closed by means of the valves 27 with the cylinder case, not shown, so that oil will enter into the steam chest or valve chamber 17 and into the cylinders.

What I claim is:

A balanced slide valve for compound engines having a housing containing high and low pressure cylinders, placed side by side and with their pistons rigidly connected; the body of said valve being in the shape of a rectangular prism, said housing having a chamber for said valve body, a central exhaust port from the chamber and steam admittance ports leading to each end of said chamber, a rear end steam passage and a front end steam passage for each cylinder, all of said passages opening into the extreme ends of their respective cylinders, and ports at the adjacent ends of the passages leading into said valve chamber, the two said passage-ports for the low pressure cylinder being closer together than the two ports for the high pressure cylinders; said valve body having a cavity on one side always communicating with said exhaust port, and a live steam duct through its body with openings on the same side as said cavity but in front and rear thereof; whereby said body, when in its forward position opens said rear passage-port to admit fresh steam into the rear end of the high pressure cylinder, simultaneously connecting said front passage port for the high pressure cylinder with said rear passage-port of the low pressure cylinder by way of said valve duct, in order to pass live steam from the front end of the high pressure cylinder to the rear end of the low pressure cylinder, said valve cavity simultaneously connecting said front passage-port of the low pressure cylinder with the exhaust port.

The foregoing specification signed at Montgomery, W. Va., this 26 day of Sept. 1912.

JACOB COMBS.

In presence of two witnesses:
JOHN COBB,
G. A. CUSTAN.